UNITED STATES PATENT OFFICE.

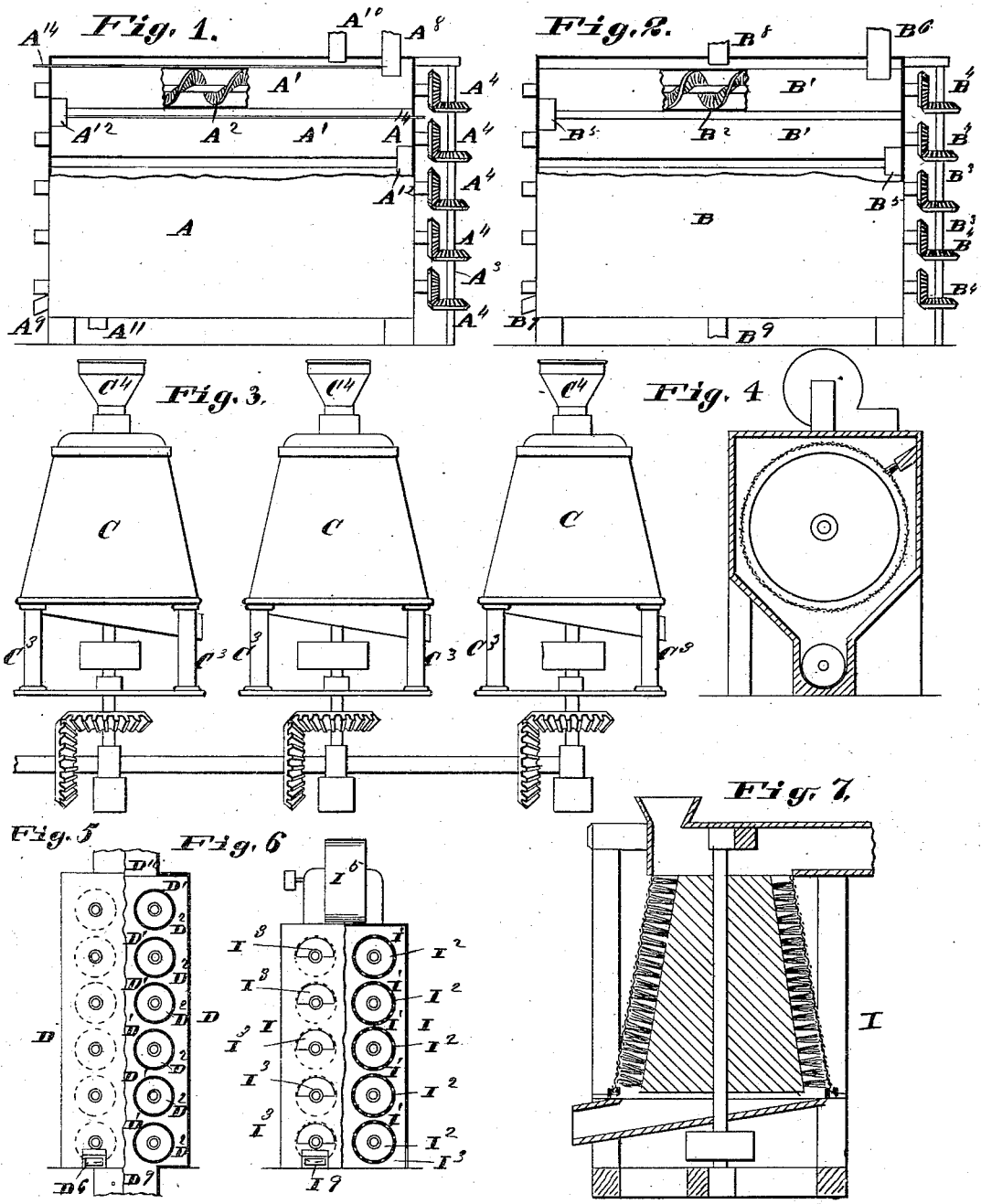

FREDRICH BURCKHARDT, OF ST. CHARLES, MISSOURI.

PROCESS OF MANUFACTURING HOMINY, GRITS, &c.

SPECIFICATION forming part of Letters Patent No. 313,982, dated March 17, 1885.

Application filed November 9, 1883. (No model.)

*To all whom it may concern:*

Be it known that I, FREDRICH BURCKHARDT, of St. Charles, in the county of St. Charles and State of Missouri, have invented a certain new and useful Process of Manufacturing Hominy, Grits, &c., of which the following is a full, clear, and exact description, reference being had to the accompanying drawings, forming part of this specification, and in which—

Figure 1 is a steamer for moistening the grain, part in elevation and part in vertical section. Fig. 2 is a steam-drier, part in elevation and part in vertical section. Fig. 3 is a side elevation of a hulling apparatus. Fig. 4 is a vertical section of a cleaner or separator. Fig. 5 is an end elevation, part in section, of a kiln or air-drier. Fig. 6 is an end elevation, part in section, of a cooler. Fig. 7 is a vertical section of a polisher.

In Fig. 1, A represents an outer casing, within which are conveyer-tubes $A'$, inclosing conveyer-screws $A^2$, driven or turned by means of a shaft, $A^3$, with which they are connected by miter-wheels $A^4$.

$A^8$ represents the pipe or spout through which the corn enters the apparatus, and $A^9$ the spout through which it is discharged.

$A^{10}$ represents the steam-supply pipe, and $A^{11}$ the pipe for the exhaust.

$A^{12}$ represent passage-ways, forming communications between the opposite ends of the conveyer-tubes, so that the corn will be discharged from one into another. Openings in the tops of the conveyer-tubes are controlled by valves $A^{14}$. The steam entering the top of the apparatus circulates through the tubes by means of these openings, heating the corn as it is conveyed from end to end of the tubes for the purpose of putting it in a condition to have the hulls removed. When the corn has been steamed to moisten it, it is next partly dried by passing it through a steam drying apparatus. (Shown in Fig. 2.) This apparatus is constructed the same as the steamer, except the conveyer-tubes are tight, so that the steam cannot enter them, which results in a partial drying of the corn.

In this apparatus, B represents the outer casing; $B'$, the conveyer-tubes; $B^2$, the conveyers; $B^3$, the driving-shaft; $B^4$, the miter-wheels; $B^5$, the passages from one conveyer-tube to another; $B^6$, the grain-inlet pipe; $B^7$, the grain-discharge pipe or spout; $B^8$, the steam-inlet pipe, and $B^9$ the exhaust-pipe. After the grain has thus been partly dried it is passed through an apparatus to remove the hulls. This hulling apparatus is shown in Fig. 3.

C represents hullers supported by posts $C^3$ or other means. On the top of each huller is a hopper, $C^4$. After the grain has passed through this hulling apparatus it is passed through a cleaner or separator. (Shown in Fig. 4.) It is next passed to a kiln or air-drier, which is represented in Fig. 5, and in which D represents an outer casing, within which are two series of conveyer-tubes, $D'$, and screws $D^2$, which are constructed and driven, and through which the grain passes, the same as above described in connection with the steamer.

$D^6$ is the discharge-spout. A current of air is caused to pass through this apparatus from bottom to top, or vice versa, entering and escaping through openings $D^9 D^{10}$, and thus the grain is dried; but still being warm it is necessary to pass it through a cooler, which is represented in Fig. 6, and in which I represents the outer casing inclosing two series of conveyer-tubes, $I'$, and screws $I^2$, which are also constructed similar to those of the steam apparatus, except the tubes are perforated, as shown, for the passage of air, which enters the casing and tubes through openings $I^3$, being drawn in by a suction-fan located in a chamber, $I^5$.

$I^9$ is the discharge-spout.

The grain may be passed to a polisher, Fig. 7, after it leaves the cooler.

For more full description of parts of the apparatus herein shown, I would refer to the following applications filed by me on the 31st December, 1883: No. 116,005, steamer; No. 116,006, steam-drier; No. 116,007, air-drier; No. 116,008, huller; No. 116,009, cooler.

I claim as my invention—

1. The herein-described process of manufacturing hominy, grits, &c., which consists in steaming the grain to moisten it, then drying it, then hulling it, then cleaning it, and then drying it by air-currents, as set forth.

2. The herein-described process of manufacturing hominy, grits, &c., which consists in steaming the grain to moisten it, then drying it, then hulling it, then cleaning it, then drying it by air-currents, and finally cooling it, as set forth.

FREDRICH BURCKHARDT.

Witnesses:
GEO. H. KNIGHT,
BENJ. A. KNIGHT.